(12) United States Patent
Kompella et al.

(10) Patent No.: US 12,483,500 B1
(45) Date of Patent: *Nov. 25, 2025

(54) ENCODING FORWARDING POLICY DATA IN MULTIPROTOCOL LABEL SWITCHING (MPLS) LABELS

(71) Applicant: Juniper Networks, Inc., Sunnyvale, CA (US)

(72) Inventors: Kireeti Kompella, Los Altos, CA (US); Vishnu Pavan Beeram, Hyderabad (IN); Swamy Sadashivaiah Renu Kananda, Cupertino, CA (US); Jonathan C. Barth, Collegeville, PA (US); Tarek Saad, Ottawa (CA); Chandrasekar Ramachandran, Bangalore (IN); Srihari Ramachandra Sangli, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 18/448,777

(22) Filed: Aug. 11, 2023

Related U.S. Application Data

(63) Continuation of application No. 17/527,806, filed on Nov. 16, 2021, now Pat. No. 11,770,331.

(51) Int. Cl.
*H04L 45/50* (2022.01)
*H04L 47/20* (2022.01)

(52) U.S. Cl.
CPC .............. *H04L 45/50* (2013.01); *H04L 47/20* (2013.01)

(58) Field of Classification Search
CPC ..... H04L 45/50; H04L 45/507; H04L 45/566; H04L 47/20
See application file for complete search history.

(56) References Cited

U.S. PATENT DOCUMENTS

| | | | |
|---|---|---|---|
| 2009/0213726 A1* | 8/2009 | Asati | H04L 45/28 370/216 |
| 2011/0188857 A1* | 8/2011 | Zheng | H04L 12/6418 398/45 |
| 2013/0148489 A1* | 6/2013 | Boutros | H04L 45/50 370/216 |

(Continued)

OTHER PUBLICATIONS

Co-pending U.S. Appl. No. 17/527,806, inventors Kompella; Kireeti et al., filed Nov. 16, 2021.

(Continued)

*Primary Examiner* — Kan Yuen
(74) *Attorney, Agent, or Firm* — Harrity & Harrity, LLP

(57) ABSTRACT

A network device may receive an MPLS packet destined for a destination via a label-switched path (LSP), and may determine whether to apply a first special purpose label (SPL) option or a second SPL option for a label stack of the MPLS packet. The network device may apply, when the first SPL option is determined to be applied, one of a first type of the first SPL option for the label stack via a policy data indicator (PDI) and policy data (PD), or a second type of the first SPL option for the label stack via the PDI and the PD. The network device may forward the MPLS packet to a hop of the LSP based on the first type of the first SPL option or the second type of the first SPL option applied to the MPLS packet.

20 Claims, 11 Drawing Sheets

(56) References Cited

U.S. PATENT DOCUMENTS

| | | |
|---|---|---|
| 2020/0120408 A1 | 4/2020 | Boyd et al. |
| 2020/0358698 A1 | 11/2020 | Song et al. |
| 2021/0135986 A1 | 5/2021 | Song et al. |
| 2021/0203598 A1 | 7/2021 | Kompella et al. |
| 2023/0362101 A1* | 11/2023 | Varga ................ H04L 12/4633 |

OTHER PUBLICATIONS

Kompella K., et al., "Multi-purpose Special Purpose Label for Forwarding Actions drafl-kompella-mpls-mspl4fa-00," Feb. 22, 2021, pp. 1-11. Retrieved from the Internet: [URL: https://datatracker.letf.org/doc/html/draft-kompella-mpls-mspl4fa-00].

Kompella K., et al., "Multi-purpose Special Purpose Label for Forwarding Actions drafl-kompella-mpls-mspl4fa-01," Jul. 12, 2021, pp. 1-12. Retrieved from the Internet: [URL: website: https://datatracker.ietf.org/doc/html/draft-kompella-mpls-mspl4fa-01].

* cited by examiner

First type of the first SPL option

| | TC | C | S | TTL |
|---|---|---|---|---|
| Tunnel Label-1 | MBZ | | 0 | MBZ |
| Tunnel Label-2 | MBZ | | 0 | MBZ |
| Policy Data Indicator | MBZ | | 0 | MBZ |
| Policy Data-0 | MBZ | 1 | 0 | MBZ |
| Policy Data-1 | MBZ | 0 | 0 | MBZ |
| VPN Label | MBZ | | 1 | MBZ |
| b b b b | (payload/control word) | | | |

$bbbb = 0x4$ (IPv4)
    $= 0x6$ (IPv6)
    $= 0x0$ (non-IP)

← C=1, PD continues
← C=0, PD ends;
    S=0, LS continues
← S=1, LS ends

Second type of the first SPL option

| | TC | C | S | TTL |
|---|---|---|---|---|
| Tunnel Label-1 | MBZ | | 0 | MBZ |
| Tunnel Label-2 | MBZ | | 0 | MBZ |
| Policy Data Indicator | MBZ | | 0 | MBZ |
| Policy Data-0 | MBZ | 1 | 0 | MBZ |
| Policy Data-1 | MBZ | 0 | 1 | MBZ |
| b b b b | (payload/control word) | | | |

$bbbb = 0x4$ (IPv4)
    $= 0x6$ (IPv6)
    $= 0x0$ (non-IP)

← C=1, PD continues
← C=0, PD ends;
    S=1, LS ends

FIG. 1C

First type of the second SPL option

| C | R | TC | S | TTL | |
|---|---|---|---|---|---|
| | | Tunnel Label-1 | | MBZ | |
| | | Tunnel Label-2 | | MBZ | |
| | | Policy Data Indicator | | MBZ | |
| | | Entropy Label | 1 | MBZ | ← S=1, LS appears to end |
| 1 | | Policy Data-1 | | | ← C=1, PD continues |
| 1 | | Policy Data-2 | | | ← C=1, PD continues |
| 1 | | Policy Data-3 | | | ← C=1, PD continues |
| 0 | 1 | Policy Data-4 | | | ← C=0, PD ends; R=1, LS ends |
| b b b b | | (payload/control word) | | | | b b b b = 0x4 (IPv4)
       = 0x6 (IPv6)
       = 0x0 (non-IP)

Second type of the second SPL option

| C | R | TC | S | TTL | |
|---|---|---|---|---|---|
| | | Tunnel Label-1 | | MBZ | |
| | | Tunnel Label-2 | | MBZ | |
| | | Policy Data Indicator | | MBZ | |
| | | Entropy Label | 1 | MBZ | ← S=1, LS appears to end |
| 1 | | Policy Data-1 | | | ← C=1, PD continues |
| 1 | | Policy Data-2 | | | ← C=1, PD continues |
| 0 | 0 | Policy Data-3 | | | ← C=0, PD ends; R=0, LS continues |
| | | VPN Label | 1 | MBZ | ← S=1, LS ends |
| b b b b | | (payload/control word) | | | | b b b b = 0x4 (IPv4)
       = 0x6 (IPv6)
       = 0x0 (non-IP)

FIG. 1E

Third type of the second SPL option

| C | R | TC | S | TTL | |
|---|---|---|---|---|---|
| Tunnel Label-1 | | MBZ | 0 | MBZ | |
| Tunnel Label-2 | | MBZ | 0 | MBZ | |
| Policy Data Indicator | | MBZ | 0 | MBZ | |
| Entropy Label | | MBZ | 1 | MBZ | ← S=1, LS appears to end |
| 0 | 1 | Policy Data-1 | | | ← C=0, PD ends;<br>← R=1, LS ends |
| b b b b | | | | | |
| (payload/control word) | | | | | | b b b b = 0x4 (IPv4)
        = 0x6 (IPv6)
        = 0x0 (non-IP)

Fourth type of the second SPL option

| C | R | TC | S | TTL | |
|---|---|---|---|---|---|
| Tunnel Label-1 | | MBZ | 0 | MBZ | |
| Tunnel Label-2 | | MBZ | 0 | MBZ | |
| Policy Data Indicator | | MBZ | 0 | MBZ | |
| Entropy Label | | MBZ | 1 | MBZ | ← S=1, LS appears to end |
| 0 | 0 | Policy Data-1 | | | ← C=0, PD ends;<br>← R=0, LS continues |
| VPN Label | | MBZ | 1 | MBZ | ← S=1, LS ends |
| b b b b | | | | | |
| (payload/control word) | | | | | | b b b b = 0x4 (IPv4)
        = 0x6 (IPv6)
        = 0x0 (non-IP)

FIG. 1F

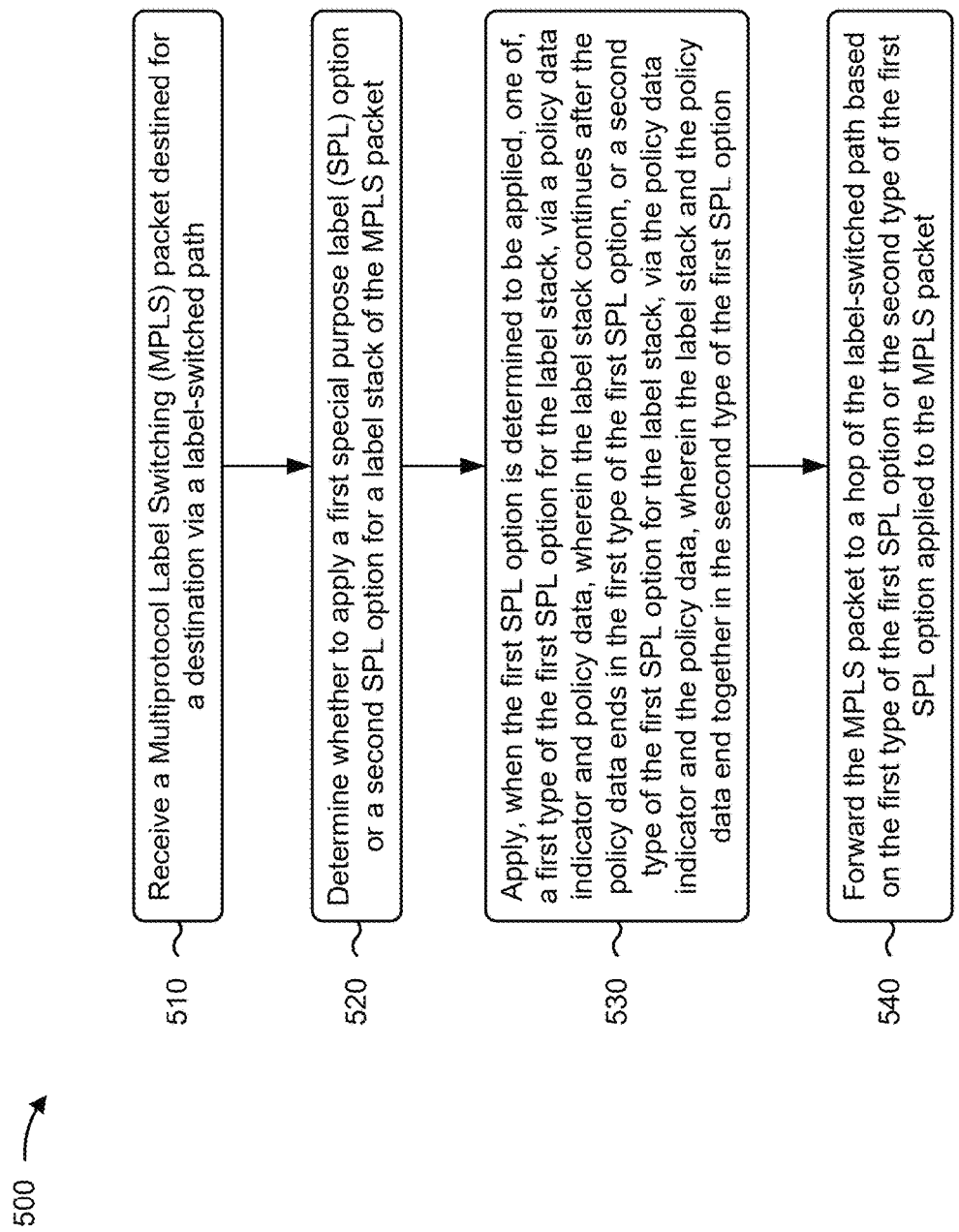

US 12,483,500 B1

ENCODING FORWARDING POLICY DATA IN MULTIPROTOCOL LABEL SWITCHING (MPLS) LABELS

RELATED APPLICATION

This application is a continuation of U.S. patent application Ser. No. 17/527,806, filed Nov. 16, 2021, which is incorporated herein by reference in its entirety.

BACKGROUND

There are multiple multiprotocol label switching (MPLS)-based features that require one or more policies to be applied in a forwarding plane at select hops (e.g., network devices) along a path of a label-switched path (LSP).

SUMMARY

Some implementations described herein relate to a method. The method may include receiving an MPLS packet destined for a destination via a label-switched path, and determining whether to apply a first special purpose label (SPL) option or a second SPL option for a label stack of the MPLS packet. The method may include applying, when the first SPL option is determined to be applied, one of a first type of the first SPL option for the label stack, via a policy data indicator and policy data, where the label stack continues after the policy data ends in the first type of the first SPL option, or a second type of the first SPL option for the label stack, via the policy data indicator and the policy data, where the label stack and the policy data end together in the second type of the first SPL option. The method may include forwarding the MPLS packet to a hop of the label-switched path based on the first type of the first SPL option or the second type of the first SPL option applied to the MPLS packet.

Some implementations described herein relate to a network device. The network device may include one or more memories and one or more processors. The one or more processors may be configured to receive an MPLS packet destined for a destination via a label-switched path, and determine whether to apply a first SPL option or a second SPL option for a label stack of the MPLS packet. The one or more processors may be configured to apply, when the first SPL option is determined to be applied, one of a first type of the first SPL option for the label stack, via a policy data indicator and policy data, where the label stack continues after the policy data ends in the first type of the first SPL option, or a second type of the first SPL option for the label stack, via the policy data indicator and the policy data, where the label stack and the policy data end together in the second type of the first SPL option. The one or more processors may be configured to cause the MPLS packet to be provided to the destination, via the label-switched path, based on the first type of the first SPL option or the second type of the first SPL option applied to the MPLS packet.

Some implementations described herein relate to a non-transitory computer-readable medium that stores a set of instructions for a network device. The set of instructions, when executed by one or more processors of the network device, may cause the network device to receive an MPLS packet destined for a destination via a label-switched path, and determine whether to apply a first SPL option or a second SPL option for a label stack of the MPLS packet. The set of instructions, when executed by one or more processors of the network device, may cause the network device to apply, when the first SPL option is determined to be applied, one of a first type of the first SPL option for the label stack, via a policy data indicator and policy data, where the label stack continues after the policy data ends in the first type of the first SPL option, or a second type of the first SPL option for the label stack, via the policy data indicator and the policy data, where the label stack and the policy data end together in the second type of the first SPL option. The set of instructions, when executed by one or more processors of the network device, may cause the network device to apply, when the second SPL option is determined to be applied, one of a first type of the second SPL option for the label stack, via the policy data indicator and the policy data, where the policy data continues after the label stack appears to end in the first type of the second SPL option, a second type of the second SPL option for the label stack, via the policy data indicator and the policy data, where the policy data continues after the label stack appears to end and the label stack continues and ends after the policy data ends in the first type of the second SPL option, a third type of the second SPL option for the label, via the policy data indicator and the policy data, where the policy data is provided after the label stack appears to end and the label stack and the policy data end together in the third type of the second SPL option, or a fourth type of the second SPL option for the label, via the policy data indicator and the policy data, where the policy data is provided after the label stack appears to end and the label stack continues and ends after the policy data ends in the fourth type of the second SPL option. The set of instructions, when executed by one or more processors of the network device, may cause the network device to forward the MPLS packet to a hop of the label-switched path based on the first type of the first SPL option, the second type of the first SPL option, the first type of the second SPL option, the second type of the second SPL option, the third type of the second SPL option, or the fourth type of the second SPL option applied to the MPLS packet.

BRIEF DESCRIPTION OF THE DRAWINGS

FIGS. 1A-1G are diagrams of an example associated with encoding forwarding policy in MPLS labels.

FIG. 5 is a flowchart of an example process for encoding forwarding policy in MPLS labels.

DETAILED DESCRIPTION

Figure 1A:
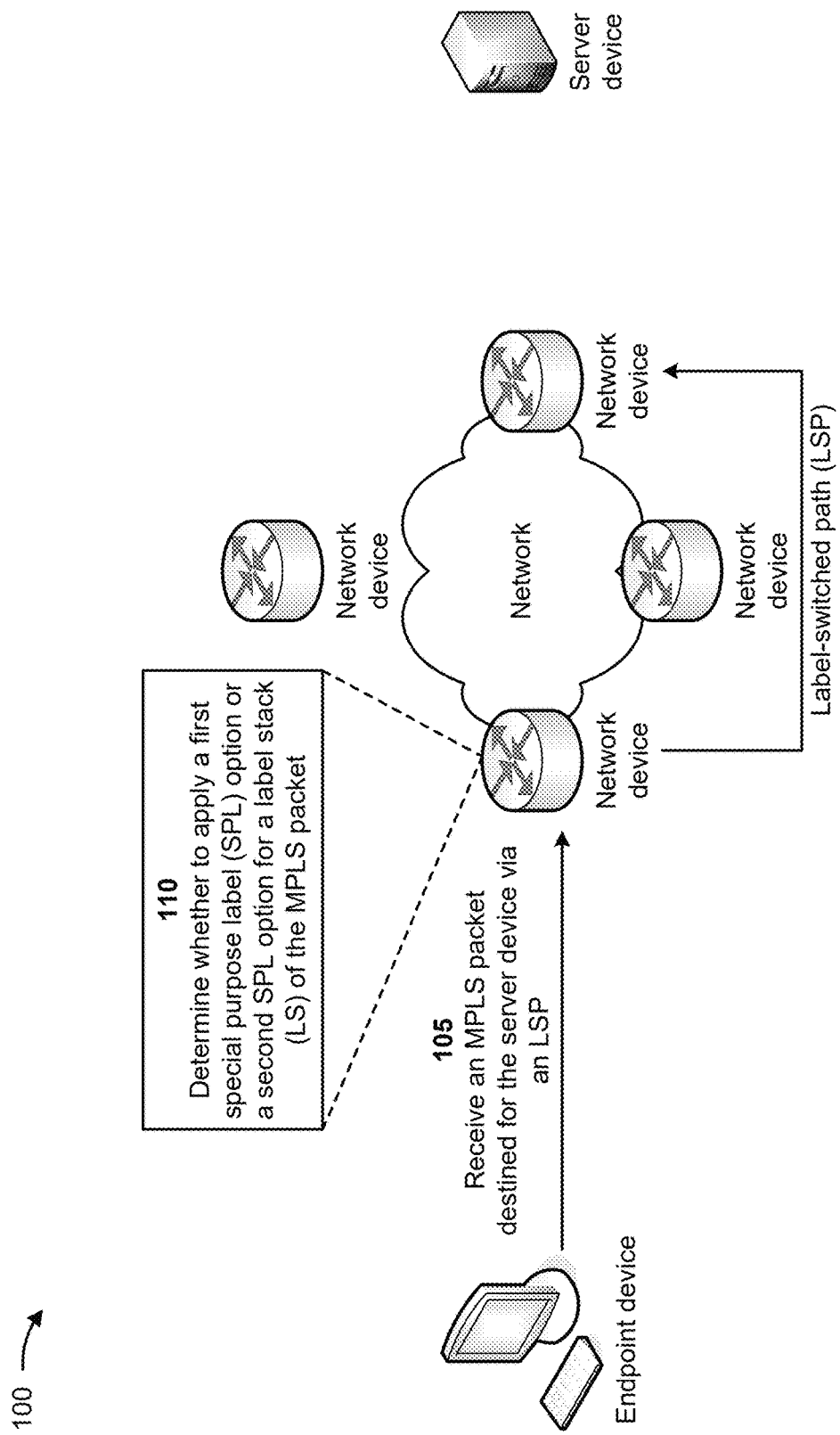

The following detailed description of example implementations refers to the accompanying drawings. The same reference numbers in different drawings may identify the same or similar elements.

Each MPLS-based feature requires specific policy data to be carried in an MPLS packet to be transmitted by network devices along an LSP. The specific policy data may include a classifier identifier for the packet, such as a slice-aggregator identifier to which the packet belongs (e.g., to enable per-slice forwarding treatment, which is a scheduling and drop policy); a segment routing (SR) path to which the packet belongs (e.g., to enable per-path traffic accounting); and/or the like. The specific policy may include a specific indicator to be carried by the packet, such as checking for in-situ Operations, Administration, and Maintenance (iOAM) data (e.g., used to populate metadata beyond the end of an MPLS label stack). However, defining a new special purpose label or an extended special purpose label for every new MPLS-based feature is expensive due to network device reconfiguration requirements, and depletes a limited quantity of special purpose labels since a special purpose label is utilized for every action performed by the network device. Thus, current techniques for defining a new special purpose label for every new MPLS-based feature consume computing resources (e.g., processing resources, memory resources, communication resources, and/or the like), networking resources, and/or the like, associated with reconfiguring network devices to handle new special purpose labels, depleting the limited quantity of special purpose labels by utilizing a special purpose label for every action performed by the network device, and/or the like.

Some implementations described herein relate to a network device that encodes a forwarding policy in MPLS labels. For example, a network device may receive an MPLS packet destined for a destination via a label-switched path, and may determine whether to apply a first special purpose label (SPL) option or a second SPL option for a label stack of the MPLS packet. The network device may apply, when the first SPL option is determined to be applied, one of a first type of the first SPL option for the label stack, via a policy data indicator and policy data, or a second type of the first SPL option for the label stack, via the policy data indicator and the policy data. The label stack may continue after the policy data ends in the first type of the first SPL option, and the label stack and the policy data may end together in the second type of the first SPL option. The network device may forward the MPLS packet to a hop of the label-switched path based on the first type of the first SPL option or the second type of the first SPL option applied to the MPLS packet.

In this way, the network device encodes the forwarding policy in MPLS labels. For example, a network device may utilize a policy data indicator to identify policy data encoded in MPLS labels. The network device may utilize either of two options to encode the policy data in the MPLS labels. The first option may include the network device utilizing the policy data indicator (e.g., a special purpose label) and the policy data as regular labels in the MPLS labels. The network device may utilize the policy data indicator to identify the policy data that follows the policy data indicator. A label stack continues through policy data words (e.g., four octet fields) so that each policy data word appears to be a label. The second option may include the network device ending a label stack with the policy data indicator and the policy data. The label stack may appear to be terminated by the policy data, but may actually continue. However, this enables the policy data words to not masquerade as labels. Thus, the network device conserves computing resources, networking resources, and/or the like that would otherwise have been consumed by reconfiguring network devices to handle new special purpose labels, depleting the limited quantity of special purpose labels by utilizing a special purpose label for every action performed by the network device, and/or the like.

FIGS. 1A-1G are diagrams of an example 100 associated with encoding a forwarding policy in MPLS labels. As shown in FIGS. 1A-1G, example 100 includes an endpoint device, a network with a plurality of network devices, and a server device. Further details of the endpoint device, the network, the network devices, and the server device are provided elsewhere herein.

As shown in FIG. 1A, and by reference number 105, the network device may receive an MPLS packet destined for a destination (e.g., the server device) via a label-switched path (LSP). For example, the endpoint device may generate an MPLS packet destined for a destination, such as the server device. The endpoint device may provide the MPLS packet to one of the network devices (hereinafter referred to as the network device), and the network device may receive the MPLS packet. The network device may determine that the MPLS packet is to be provided to the server device via an LSP of other network devices, as further shown in FIG. 1A. The LSP may include one or more other network devices and may be utilized to route the MPLS packet to the server device. In some implementations, multiple MPLS-based features that require one or more policies to be applied in a forwarding plane may be provided by select hops (e.g., network devices) along the LSP.

As further shown in FIG. 1A, and by reference number 110, the network device may determine whether to apply a first SPL option or a second SPL option for a label stack (LS) of the MPLS packet. For example, the network device may select from the first SPL option or the second SPL option for the label stack of the MPLS packet (e.g., both options may coexist). The SPL for both the first SPL option and the second SPL option is a policy data indicator (PDI) that enables encoding of policy data (PD) in the label of the MPLS packet and indicates that what follows is policy data.

In the first SPL option, the policy data indicator and the policy data act as regular labels in the label stack of the MPLS packet. The label stack may continue through policy data words (e.g., four-octet fields) where each policy data word appears to be a label of the label stack. In the first SPL option, each policy data word may utilize a particular quantity of bits (e.g., twenty bits) of a label value; a time to live (TTL) of the label stack may be set to zero (e.g., must be zero (MBZ)); an end of stack bit (S) of the label stack may retain a conventional meaning; and a traffic class (TC) field of the label stack may be treated specially since the TC field includes a continuation bit (C). When the continuation bit is equal to a first value (e.g., one, C=1), the policy data may continue in the label stack to a next policy data word. When the continuation bit is equal to a second value (e.g., zero, C=0), a policy data word being processed is a last policy data word of the policy data. The first SPL option may retain the convention that an MPLS packet includes a single label stack. Furthermore, if a network device is unable to recognize the policy data indicator and process the policy data, the network device may continue to utilize the policy data in a hash computation. In some implementations, when the MPLS packet is part of a flow of packets, the network device may apply the policy data to each packet of the flow of packets to prevent reordering of the packets. In some implementations, the policy data indicator and the policy data are provided at a bottom of the label stack or above a service label (e.g., a virtual private network (VPN) label) of the MPLS packet. In some implementations, the policy data indicator and the policy data are provided within readable label depth capabilities of other network devices of the label-switched path.

In the second SPL option, the policy data indicator and the policy data end the label stack. The label stack may appear to be terminated by the policy data but may actually continue after the policy data. However, this means that the policy data words do not have to masquerade as labels in the label stack. In the second SPL option, a TTL of the label stack may be set to zero (e.g., MBZ), an end of stack bit (S) of the label stack may retain a conventional meaning, a TC field of the label stack may be treated specially since the TC field includes a continuation bit (C), and a real end of stack bit (R)

of the label stack may indicate a real end of the label stack. When the continuation bit is equal to a first value (e.g., one, C=1), the policy data may continue in the label stack to a next policy data word. When the continuation bit is equal to a second value (e.g., zero, C=0), a policy data word being processed is a last policy data word of the policy data. When the end of stack bit is equal to a value (e.g., one, S=1), the label stack may appear to end. When the real end of stack bit is equal to a first value (e.g., zero, R=0), the label stack may continue. When the real end of stack bit is equal to a second value (e.g., one, R=1), the label stack may actually end. In the second SPL option, the policy data indicator and the policy data may end the label stack. In some implementations, the policy data is associated with a slice-aggregator identifier to which the MPLS packet belongs, a segment routing path to which the MPLS packet belongs, a policy to populate metadata beyond an end of the label stack, and/or the like.

Figure 1B:
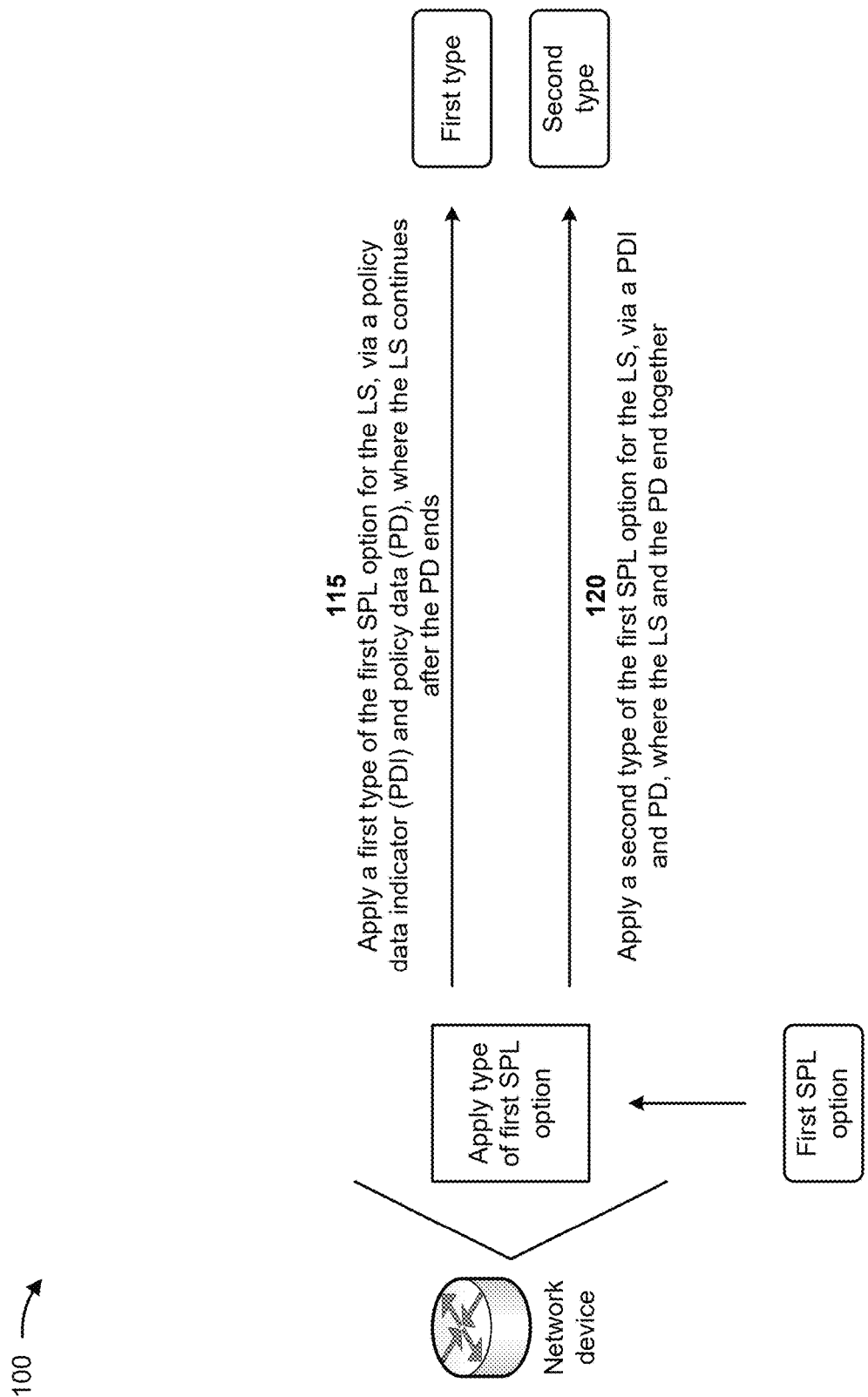

As shown in FIG. 1B, when the first SPL option is determined to be applied, the network device may apply one of a first type of the first SPL option or a second type of the first SPL option. As further shown, and by reference number 115, the network device may apply the first type of the first SPL option for the label stack, via the policy data indicator and the policy data, where the label stack continues after the policy data ends. For example, in the first type of the first SPL option, the network device may provide the policy data indicator and the policy data above a service label (e.g., a VPN label) of the label stack of the MPLS packet. In some implementations, since the policy data indicator and the policy data may be provided above the service label of the label stack, the label stack may continue (e.g., to the service label) after the policy data ends.

As further shown in FIG. 1B, and by reference number 120, the network device may apply the second type of the first SPL option for the label stack, via the policy data indicator and the policy data, where the label stack and the policy data end together. For example, in the second type of the first SPL option, the network device may provide the policy data indicator and the policy data at a bottom of the label stack (e.g., a label stack identifying tunnel labels of the label-switched path) of the MPLS packet. In some implementations, since the policy data indicator and the policy data may be provided below or at the bottom of the label stack, the label stack and the policy data may end together.

A top portion of FIG. 1C depicts the first type of the first SPL option. As shown, the first type of the first SPL option may include a field that identifies labels of the label stack (e.g., Tunnel Label-1, Tunnel Label-2, and VPN Label), the policy data indicator, and the policy data (e.g., Policy Data-0 and Policy Data-1). The first type of the first SPL option may include a TC field (e.g., with MBZ for all entries), a continuation bit (C) field, an end of stack bit (S) field, and a TTL field (e.g., with MBZ for all entries). When the continuation bit is equal to a first value (e.g., C=1), the policy data may continue in the first type of the first SPL option. When the continuation bit is equal to a second value (e.g., C=0), the policy data may end after a current policy data word is processed. When the end of stack bit is equal to a first value (e.g., S=0), the label stack may continue after the policy data ends. When the end of stack bit is equal to a second value (e.g., S=1), the label stack may end. As further shown, the first type of the first SPL option may include a payload and/or a control word associated with an indicator (e.g., b b b b) of Internet protocol (IP) version 4 (IPv4), IP version 6 (IPv6), or non-IP.

A bottom portion of FIG. 1C depicts the second type of the first SPL option. As shown, the second type of the first SPL option may include a field that identifies labels of the label stack (e.g., Tunnel Label-1 and Tunnel Label-2), the policy data indicator, and the policy data (e.g., Policy Data-0 and Policy Data-1). The second type of the first SPL option may include a TC field (e.g., with MBZ for all entries), a continuation bit (C) field, an end of stack bit (S) field, and a TTL field (e.g., with MBZ for all entries). When the continuation bit is equal to a first value (e.g., C=1), the policy data may continue in the second type of the first SPL option. When the continuation bit is equal to a second value (e.g., C=0), the policy data may end after a current policy data word is processed. When the end of stack bit is equal to a value (e.g., S=1), the label stack may end when the policy data ends. As further shown, the second type of the first SPL option may include a payload and/or a control word associated with an indicator (e.g., b b b b) of IPv4, IPv6, or non-IP.

Figure 1D:
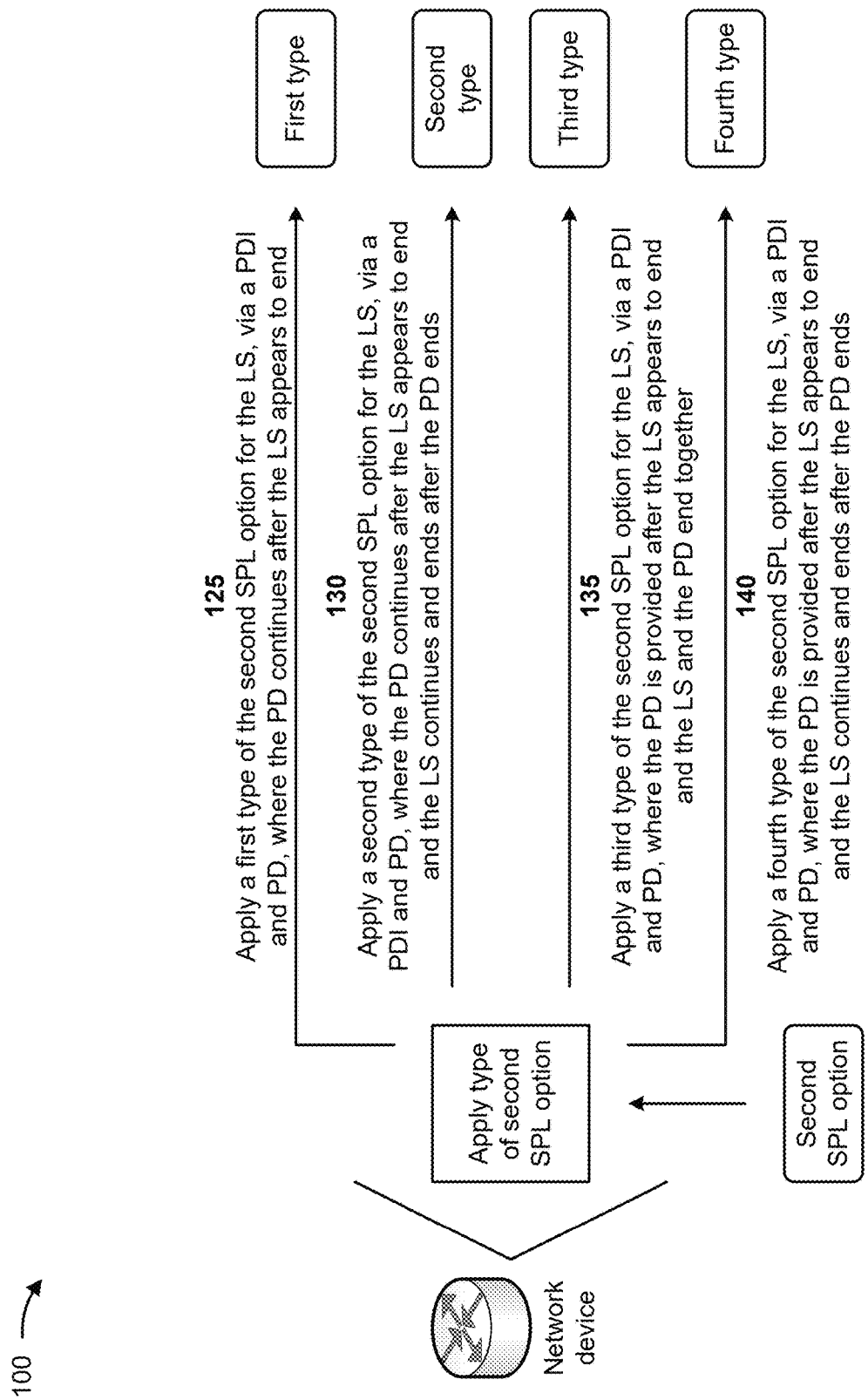

As shown in FIG. 1D, when the second SPL option is determined to be applied, the network device may apply one of a first type of the second SPL option, a second type of the second SPL option, a third type of the second SPL option, or a fourth type of the second SPL option. As further shown, and by reference number 125, the network device may apply the first type of the second SPL option for the label stack, via the policy data indicator and the policy data, where the policy data continues after the label stack appears to end. For example, in the first type of the second SPL option, the network device may provide the policy data indicator above a service label (e.g., an entropy label) of the label stack of the MPLS packet and may provide the policy data below the service label of the label stack. When the end of stack bit is equal to a value (e.g., S=1), but the real end of stack bit is not equal to a value (e.g., R≠1), the label stack may appear to end. When the continuation bit is equal to a first value (e.g., C=1) after the label stack appears to end, the policy data may continue. When the continuation bit is equal to a second value (e.g., C=0) and the real end of stack bit is equal to a value (e.g., R=1), the policy data and the label stack may end.

As further shown in FIG. 1D, and by reference number 130, the network device may apply the second type of the second SPL option for the label stack, via the policy data indicator and the policy data, where the policy data continues after the label stack appears to end and the label stack continues and ends after the policy data ends. For example, in the second type of the second SPL option, the network device may provide the policy data indicator above a first service label (e.g., an entropy label) of the label stack of the MPLS packet and may provide the policy data below the first service label but above a second service label (e.g., a VPN label) of the label stack. When the end of stack bit is equal to a value (e.g., S=1), but the real end of stack bit is not equal to a value (e.g., R≠1), the label stack may appear to end. When the continuation bit is equal to a first value (e.g., C=1) after the label stack appears to end, the policy data may continue. When the continuation bit is equal to a second value (e.g., C=0) and the real end of stack bit is equal to a value (e.g., R=0), the policy data may end and the label stack may continue. When the real end of stack bit is equal to a value (e.g., R=1), the label stack may end.

As further shown in FIG. 1D, and by reference number 135, the network device may apply the third type of the second SPL option for the label stack, via the policy data indicator and the policy data, where the policy data is provided after the label stack appears to end and the label stack and the policy data end together. For example, in the third type of the second SPL option, the network device may provide the policy data indicator above a service label (e.g., an entropy label) of the label stack of the MPLS packet and may provide the policy data below the service label of the label stack. When the end of stack bit is equal to a value (e.g., S=1), but the real end of stack bit is not equal to a value (e.g., R≠1), the label stack may appear to end. When the continuation bit is equal to a value (e.g., C=0) and the real end of stack bit is equal to a value (e.g., R=1), the policy data and the label stack may end.

As further shown in FIG. 1D, and by reference number 140, the network device may apply the fourth type of the second SPL option for the label stack, via the policy data indicator and the policy data, where the policy data is provided after the label stack appears to end and the label stack continues and ends after the policy data ends. For example, in the fourth type of the second SPL option, the network device may provide the policy data indicator above a first service label (e.g., an entropy label) of the label stack of the MPLS packet and may provide the policy data below the first service label but above a second service label (e.g., a VPN label) of the label stack. When the end of stack bit is equal to a value (e.g., S=1) but the real end of stack bit is not equal to a value (e.g., R≠1), the label stack may appear to end. When the continuation bit is equal to a value (e.g., C=0) and the real end of stack bit is equal to a value (e.g., R=0), the policy data may end and the label stack may continue. When the end of stack bit is equal to a value (e.g., S=1) after the real end of stack bit is equal to a value (e.g., R=0), the label stack may end.

A top portion of FIG. 1E depicts the first type of the second SPL option. As shown, the first type of the second SPL option may include a field that identifies labels of the label stack (e.g., Tunnel Label-1, Tunnel Label-2, and Entropy Label) and the policy data indicator, and a field that identifies the policy data (e.g., Policy Data-1, Policy Data-2, Policy Data-3, and Policy Data-4). The first type of the second SPL option may include a continuation bit (C) field, a real end of stack bit (R) field, a TC field (e.g., with MBZ for all entries), an end of stack bit (S) field, and a TTL field (e.g., with MBZ for all entries). When the end of stack bit is equal to a value (e.g., S=1), the label stack may appear to end. When the continuation bit is equal to a first value (e.g., C=1), the policy data may continue after the label stack appears to end. When the continuation bit is equal to a second value (e.g., C=0), the policy data may end after a current policy data word is processed. When the real end of stack bit is equal to a value (e.g., R=1), the label stack may end. As further shown, the first type of the second SPL option may include a payload and/or a control word associated with an indicator (e.g., b b b b) of IPv4, IPv6, or non-IP.

A bottom portion of FIG. 1E depicts the second type of the second SPL option. As shown, the second type of the second SPL option may include a field that identifies labels of the label stack (e.g., Tunnel Label-1, Tunnel Label-2, Entropy Label, and VPN Label) and the policy data indicator, and a field that identifies the policy data (e.g., Policy Data-1, Policy Data-2, and Policy Data-3). The second type of the second SPL option may include a continuation bit (C) field, a real end of stack bit (R) field, a TC field (e.g., with MBZ for all entries), an end of stack bit (S) field, and a TTL field (e.g., with MBZ for all entries). When the end of stack bit is equal to a value (e.g., S=1), the label stack may appear to end. When the continuation bit is equal to a first value (e.g., C=1), the policy data may continue after the label stack appears to end. When the continuation bit is equal to a second value (e.g., C=0), the policy data may end after a current policy data word is processed. When the real end of stack bit is equal to a value (e.g., R=0), the label stack may continue. When the end of stack bit is equal to a value (e.g., S=1) after the real end of stack bit is equal to zero, the label stack may end. As further shown, the second type of the second SPL option may include a payload and/or a control word associated with an indicator (e.g., b b b b) of IPv4, IPv6, or non-IP.

A top portion of FIG. 1F depicts the third type of the second SPL option. As shown, the third type of the second SPL option may include a field that identifies labels of the label stack (e.g., Tunnel Label-1, Tunnel Label-2, and Entropy Label) and the policy data indicator, and a field that identifies the policy data (e.g., Policy Data-1). The third type of the second SPL option may include a continuation bit (C) field, a real end of stack bit (R) field, a TC field (e.g., with MBZ for all entries), an end of stack bit (S) field, and a TTL field (e.g., with MBZ for all entries). When the end of stack bit is equal to a value (e.g., S=1), the label stack may appear to end. When the continuation bit is equal to a value (e.g., C=0), the policy data may end after a current policy data word is processed. When the real end of stack bit is equal to a value (e.g., R=1), the label stack may end. As further shown, the third type of the second SPL option may include a payload and/or a control word associated with an indicator (e.g., b b b b) of IPv4, IPv6, or non-IP.

A bottom portion of FIG. 1F depicts the fourth type of the second SPL option. As shown, the fourth type of the second SPL option may include a field that identifies labels of the label stack (e.g., Tunnel Label-1, Tunnel Label-2, Entropy Label, and VPN Label) and the policy data indicator, and a field that identifies the policy data (e.g., Policy Data-1). The fourth type of the second SPL option may include a continuation bit (C) field, a real end of stack bit (R) field, a TC field (e.g., with MBZ for all entries), an end of stack bit (S) field, and a TTL field (e.g., with MBZ for all entries). When the end of stack bit is equal to a value (e.g., S=1), the label stack may appear to end. When the continuation bit is equal to a value (e.g., C=0), the policy data may end after a current policy data word is processed. When the real end of stack bit is equal to a value (e.g., R=0), the label stack may continue. When the end of stack bit is equal to a value (e.g., S=1) after the real end of stack bit is equal to zero, the label stack may end. As further shown, the second type of the second SPL option may include a payload and/or a control word associated with an indicator (e.g., b b b b) of IPv4, IPv6, or non-IP.

Figure 1G:
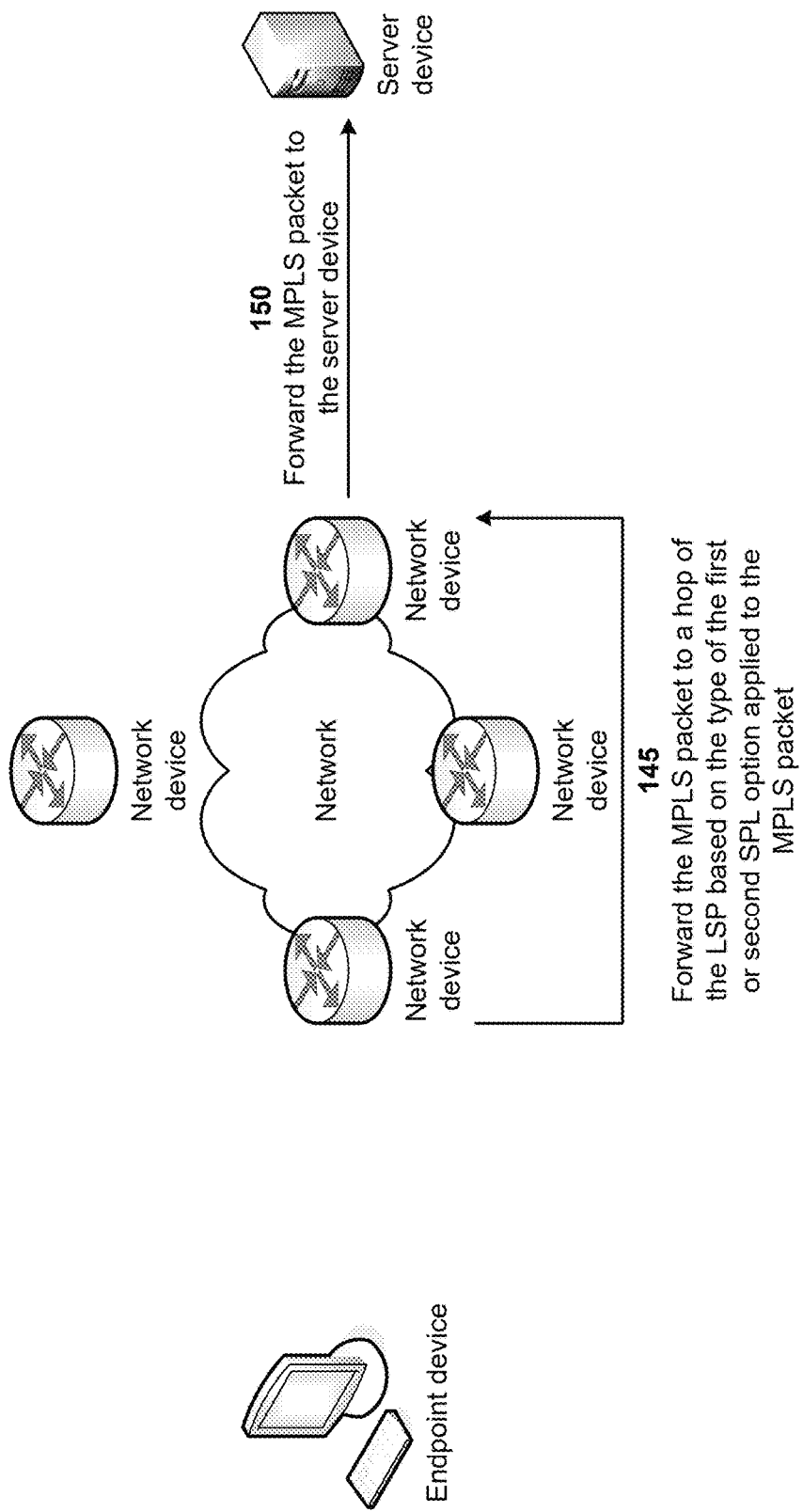

As shown in FIG. 1G, and by reference number 145, the network device may forward the MPLS packet to a hop of the label-switched path based on the type of the first or second SPL option applied to the MPLS packet. For example, the network device may identify a next hop (e.g., a network device) of the label-switched path. The network device may forward the MPLS packet to the next hop of the label-switched path based on the first type of the first SPL option, the second type of the first SPL option, the first type of the second SPL option, the second type of the second SPL option, the third type of the second SPL option, or the fourth type of the second SPL option applied to the MPLS packet. In some implementations, the next hop network device may process the MPLS packet as described above in connection with one or more of FIGS. 1A-1F. As further shown in FIG. 1G, and by reference number 150, a last hop network device of the label-switched path may forward the MPLS packet to the server device.

In this way, the network device encodes a forwarding policy in MPLS labels. For example, a network device may utilize a policy data indicator to identify policy data encoded in MPLS labels. The network device may utilize either of two options to encode the policy data in the MPLS labels. The first option may include the network device utilizing the policy data indicator (e.g., a special purpose label) and the policy data as regular labels in the MPLS labels. The network device may utilize the policy data indicator to identify the policy data that follows the policy data indicator. A label stack continues through policy data words (e.g., four octet fields) so that each policy data word appears to be a label. The second option may include the network device ending a label stack with the policy data indicator and the policy data. The label stack may appear to be terminated by the policy data, but may actually continue. However, this enables the policy data words to not masquerade as labels. Thus, the network device conserves computing resources, networking resources, and/or the like that would otherwise have been consumed by reconfiguring network devices to handle new special purpose labels, depleting the limited quantity of special purpose labels by utilizing a special purpose label for every action performed by the network device, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
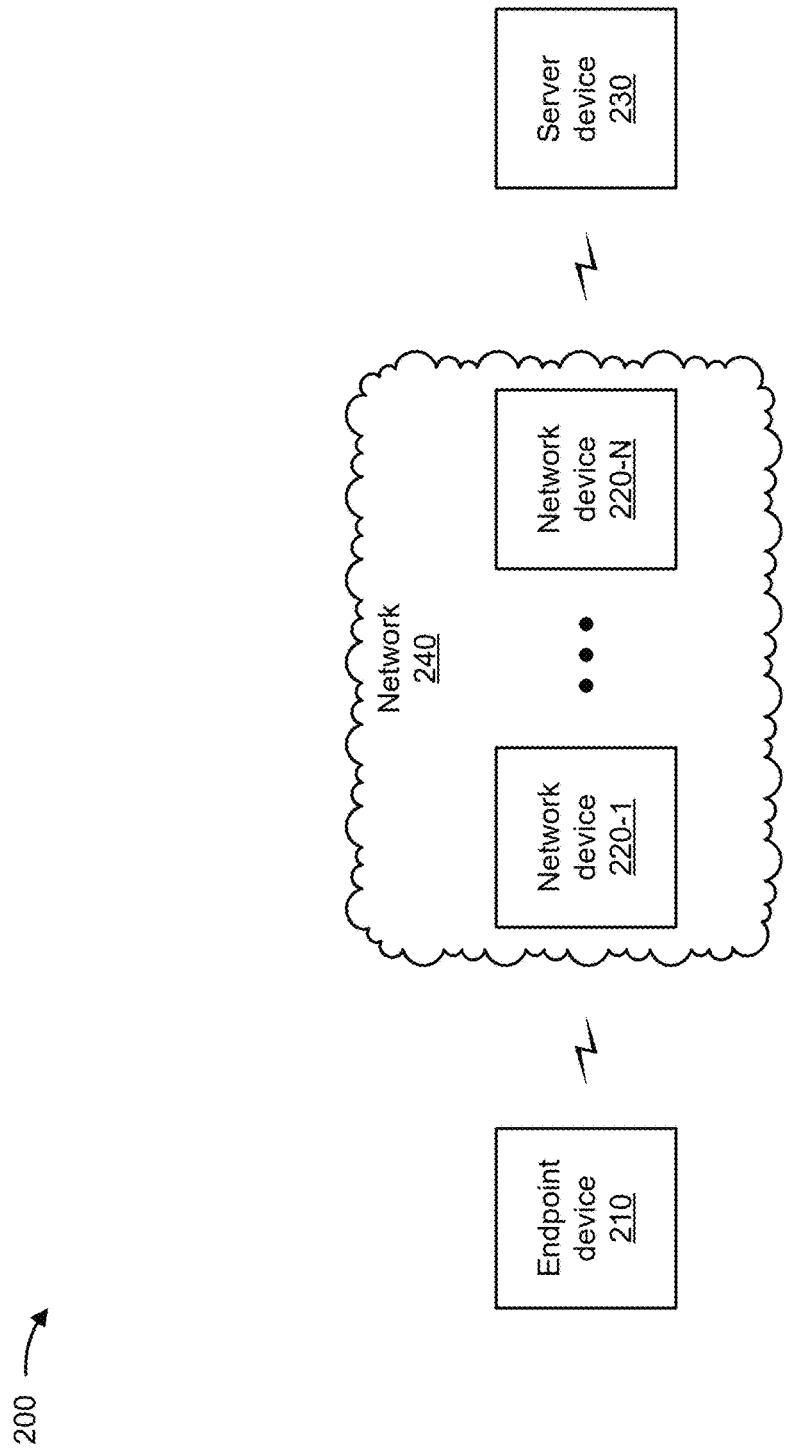
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 includes one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 includes computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
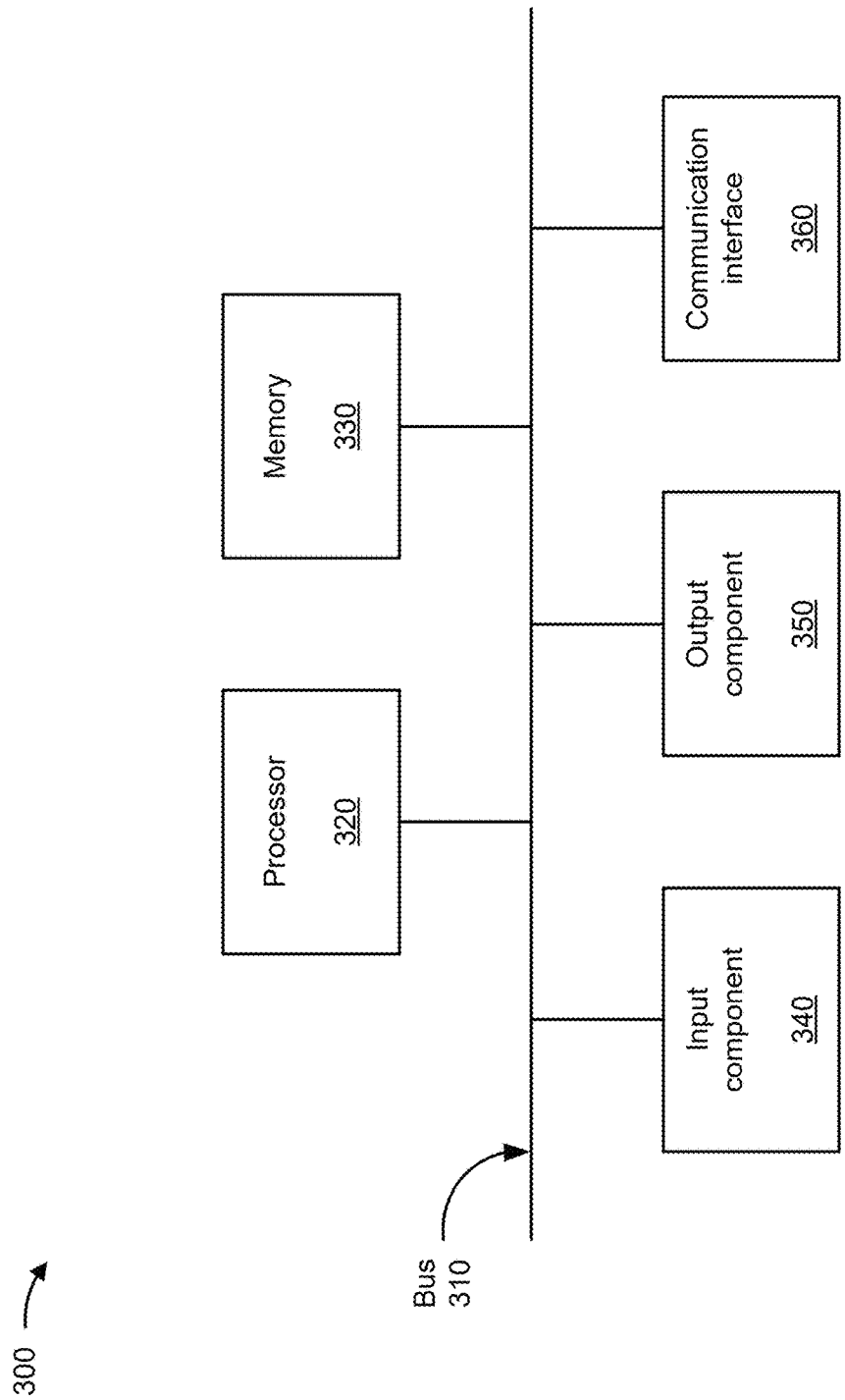
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
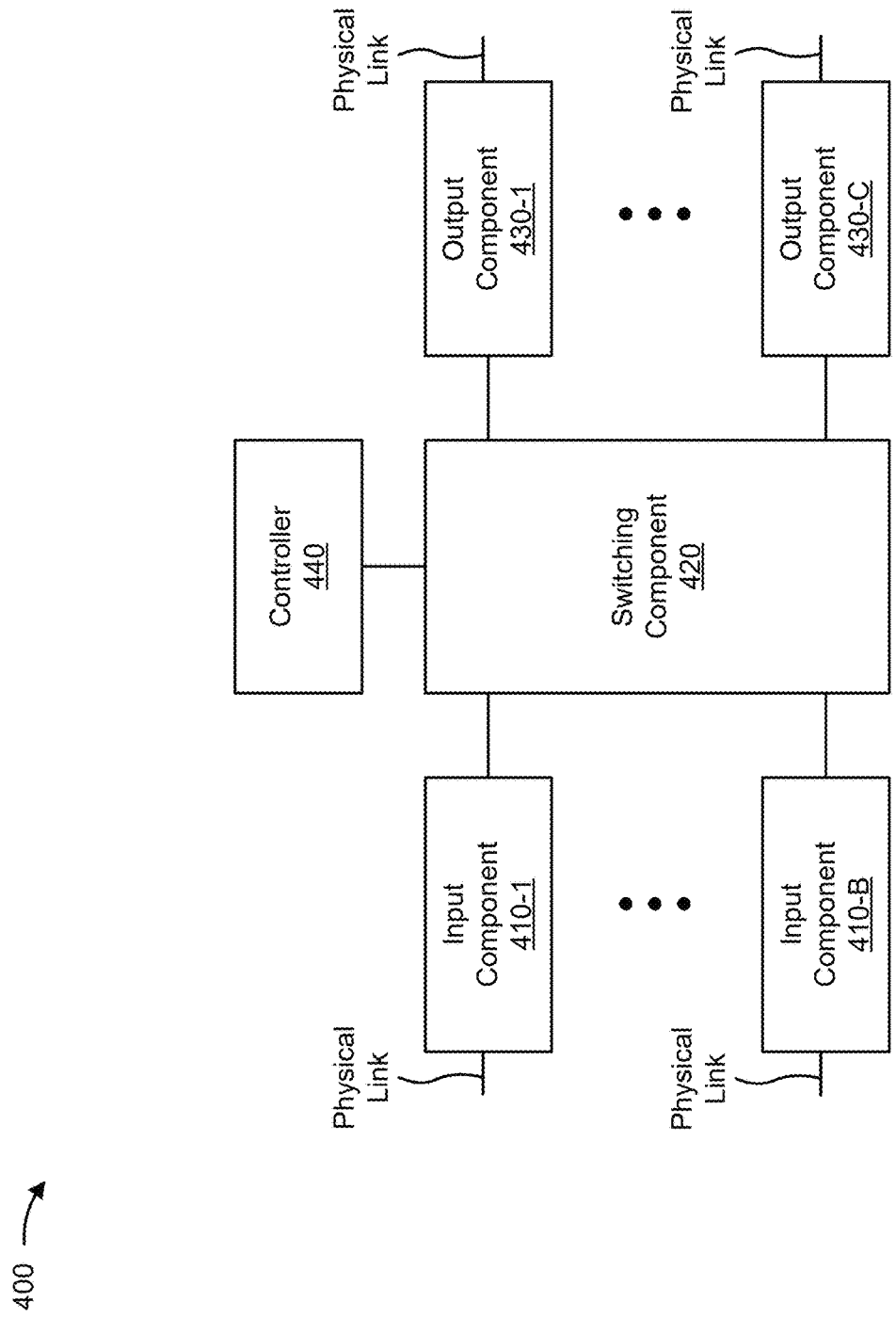

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software.

In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for encoding forwarding policy in MPLS labels. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving an MPLS packet destined for a destination via a label-switched path (block 510). For example, the network device may receive an MPLS packet destined for a destination via a label-switched path, as described above.

As further shown in FIG. 5, process 500 may include determining whether to apply a first SPL option or a second SPL option for a label stack of the MPLS packet (block 520). For example, the network device may determine whether to apply a first SPL option or a second SPL option for a label stack of the MPLS packet, as described above. In some implementations, the label stack is associated with an indicator that includes a first value indicating that the label stack continues and a second value indicating that the label stack ends. In some implementations, when the first SPL option is determined to be applied, the label stack of the MPLS packet is a single label stack.

As further shown in FIG. 5, process 500 may include applying, when the first SPL option is determined to be applied, one of a first type of the first SPL option for the label stack, via a policy data indicator and policy data, wherein the label stack continues after the policy data ends in the first type of the first SPL option, or a second type of the first SPL option for the label stack, via the policy data indicator and the policy data, wherein the label stack and the policy data end together in the second type of the first SPL option (block 530). For example, the network device may apply, when the first SPL option is determined to be applied, one of a first type of the first SPL option for the label stack, via a policy data indicator and policy data, or a second type of the first SPL option for the label stack, via the policy data indicator and the policy data, as described above. In some implementations, the label stack continues after the policy data ends in the first type of the first SPL option, and the label stack and the policy data end together in the second type of the first SPL option. In some implementations, the policy data indicator includes a first value indicating that the policy data continues to a next policy data word and a second value indicating that the policy data ends after a policy data word being processed.

In some implementations, when the MPLS packet is part of a flow of packets, the policy data is applied to each packet of the flow of packets to prevent reordering of the packets. In some implementations, the policy data indicator and the policy data are provided at a bottom of the label stack or above a service label of the MPLS packet. In some implementations, the policy data indicator and the policy data are provided within readable label depth capabilities of other network devices of the label-switched path. In some implementations, the policy data indicator and the policy data are labels of the label stack in the first SPL option. In some implementations, the policy data indicator and the policy data end the label stack in the second SPL option. In some implementations, the policy data is associated with one or more of a slice-aggregator identifier to which the MPLS packet belongs, a segment routing path to which the MPLS packet belongs, or a policy to populate metadata beyond an end of the label stack.

As further shown in FIG. 5, process 500 may include forwarding the MPLS packet to a hop of the label-switched path based on the first type of the first SPL option or the second type of the first SPL option applied to the MPLS packet (block 540). For example, the network device may forward the MPLS packet to a hop of the label-switched path based on the first type of the first SPL option or the second type of the first SPL option applied to the MPLS packet, as described above.

In some implementations, process 500 includes applying, when the second SPL option is determined to be applied, one of a first type of the second SPL option for the label stack, via the policy data indicator and the policy data, wherein the policy data continues after the label stack appears to end in the first type of the second SPL option; a second type of the second SPL option for the label stack, via the policy data indicator and the policy data, wherein the policy data continues after the label stack appears to end and the label stack continues and ends after the policy data ends in the first type of the second SPL option; a third type of the second SPL option for the label, via the policy data indicator and the policy data, wherein the policy data is provided after the label stack appears to end and the label stack and the policy data end together in the third type of the second SPL option; or a fourth type of the second SPL option for the label, via the policy data indicator and the policy data, wherein the policy data is provided after the label stack appears to end and the label stack continues and ends after the policy data ends in the fourth type of the second SPL option; and forwarding the MPLS packet to a hop of the label-switched path based on the first type of the second SPL option, the second type of the second SPL option, the third type of the second SPL option, or the fourth type of the second SPL option applied to the MPLS packet.

In some implementations, the policy data indicator includes a first value indicating that the policy data continues to a next policy data word and a second value indicating that the policy data ends after a policy data word being processed. In some implementations, the label stack is associated with a first indicator indicating that the label stack appears to end and a second indicator indicating that the label stack actually ends.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, a multiprotocol label switching (MPLS) packet destined for a destination via a label-switched path;
   determining, by the network device, to apply a special purpose label (SPL) option for a label stack of the MPLS packet;
   applying, by the network device and based on a result of the determining, the SPL option for the label stack, via a policy indicator and policy data,
      wherein the policy data continues after the label stack appears to end, the policy data continues after the label stack appears to end and the label stack continues and ends after the policy data ends, the policy data is provided after the label stack appears to end and the label stack and the policy data end together, or the policy data is provided after the label stack appears to end and the label stack continues and ends after the policy data ends; and
   forwarding, by the network device and based on applying the SPL option for the label stack, the MPLS packet to a hop of the label-switched path.

2. The method of claim 1, wherein the policy data indicator is provided above a service label of the MPLS packet.

3. The method of claim 2, wherein the policy data is provided below the service label.

4. The method of claim 2, wherein the policy data is provided above the service label.

5. The method of claim 1, wherein the label stack is associated with a first indicator indicating that the label stack appears to end and a second indicator indicating that the label stack actually ends.

6. The method of claim 1, wherein the policy data indicator includes a first value indicating that the policy data continues to a next policy data word and a second value indicating that the policy data ends after a policy data word is processed.

7. The method of claim 1, wherein the label stack is associated with an indicator that includes a first value indicating that the label stack continues and a second value indicating that the label stack ends.

8. A network device, comprising:
one or more memories; and
one or more processors to:
receive a multiprotocol label switching (MPLS) packet destined for a destination via a label-switched path;
determine to apply a special purpose label (SPL) option for a label stack of the MPLS packet;
apply, based on a result of the determining, the SPL option for the label stack, via a policy data indicator and policy data,
wherein the policy data continues after the label stack appears to end, the policy data continues after the label stack appears to end and the label stack continues and ends after the policy data ends, the policy data is provided after the label stack appears to end and the label stack and the policy data end together, or the policy data is provided after the label stack appears to end and the label stack continues and ends after the policy data ends; and
cause the MPLS packet to be provided to the destination, via the label-switched path, based on applying the SPL option for the label stack.

9. The network device of claim 8, wherein, when the MPLS packet is part of a flow of packets, the policy data is applied to each packet of the flow of packets to prevent reordering of the packets.

10. The network device of claim 8, wherein the policy data indicator is provided above a service label of the MPLS packet.

11. The network device of claim 10, wherein the policy data is provided below the service label.

12. The network device of claim 10, wherein the policy data is provided above the service label.

13. The network device of claim 8, wherein the policy data indicator and the policy data are provided within readable label depth capabilities of other network devices of the label-switched path.

14. The network device of claim 8, wherein the policy data is associated with one or more of:
a slice-aggregator identifier to which the MPLS packet belongs,
a segment routing path to which the MPLS packet belongs, or
a policy to populate metadata beyond an end of the label stack.

15. A non-transitory computer-readable medium storing a set of instructions, the set of instructions comprising:
one or more instructions that, when executed by one or more processors of a network device, cause the network device to:
receive a multiprotocol label switching (MPLS) packet destined for a destination via a label-switched path;
determine whether to apply a first special purpose label (SPL) option or a second SPL option for a label stack of the MPLS packet; and
apply, when the second SPL option is determined to be applied, one of:
a first type of the second SPL option for the label stack, via a policy data indicator and policy data, wherein the policy data continues after the label stack appears to end in the first type of the second SPL option,
a second type of the second SPL option for the label stack, via the policy data indicator and the policy data, wherein the policy data continues after the label stack appears to end and the label stack continues and ends after the policy data ends in the first type of the second SPL option,
a third type of the second SPL option for the label, via the policy data indicator and the policy data, wherein the policy data is provided after the label stack appears to end and the label stack and the policy data end together in the third type of the second SPL option, or
a fourth type of the second SPL option for the label, via the policy data indicator and the policy data, wherein the policy data is provided after the label stack appears to end and the label stack continues and ends after the policy data ends in the fourth type of the second SPL option; and
forward the MPLS packet to a hop of the label-switched path based on the first type of the second SPL option, the second type of the second SPL option, the third type of the second SPL option, or the fourth type of the second SPL option applied to the MPLS packet.

16. The non-transitory computer-readable medium of claim 15, wherein the policy data indicator includes a first value indicating that the policy data continues to a next policy data word and a second value indicating that the policy data ends after a policy data word is processed.

17. The non-transitory computer-readable medium of claim 15, wherein the label stack is associated with a first indicator indicating that the label stack appears to end and a second indicator indicating that the label stack actually ends.

18. The non-transitory computer-readable medium of claim 15, wherein, when the MPLS packet is part of a flow of packets, the policy data is applied to each packet of the flow of packets to prevent reordering of the packets.

19. The non-transitory computer-readable medium of claim 15, wherein the policy data indicator and the policy data are provided above a service label of the MPLS packet.

20. The non-transitory computer-readable medium of claim 15, wherein the policy data indicator and the policy data are provided within readable label depth capabilities of other network devices of the label-switched path.

* * * * *